United States Patent [19]
Mandel

[11] Patent Number: 5,698,163
[45] Date of Patent: Dec. 16, 1997

[54] CONTROL SYSTEM FOR PROCESSES USING SUPERCRITICAL FLUIDS

[75] Inventor: Frederick S. Mandel, Chagrin Falls, Ohio

[73] Assignee: Ferro Corporation, Cleveland, Ohio

[21] Appl. No.: 810,965

[22] Filed: Feb. 27, 1997

Related U.S. Application Data

[63] Continuation of Ser. No. 438,681, May 10, 1995, abandoned.

[51] Int. Cl.$^6$ ........................................................ G05B 1/11
[52] U.S. Cl. ........................ 422/105; 118/663; 118/708; 364/500; 364/502; 422/109; 422/111; 422/112
[58] Field of Search .................................... 422/105, 108, 422/109, 110, 111, 112; 118/663, 666, 667, 688, 692, 708, 710, 712; 364/500, 502

[56] References Cited

U.S. PATENT DOCUMENTS

| | | | |
|---|---|---|---|
| 3,078,265 | 2/1963 | Berger et al. | 422/135 |
| 3,227,526 | 1/1966 | Scoggin | 422/111 |
| 3,926,738 | 12/1975 | Nyiri et al. | 364/500 |
| 3,981,957 | 9/1976 | van Brederode et al. | 260/878 R |
| 4,012,461 | 3/1977 | van Brederode | 260/878 R |
| 4,582,731 | 4/1986 | Smith | 427/421 |
| 4,734,227 | 3/1988 | Smith | 264/13 |
| 4,734,451 | 3/1988 | Smith | 524/493 |
| 4,970,093 | 11/1990 | Sievers et al. | 427/38 |
| 5,009,367 | 4/1991 | Nielsen | 239/3 |
| 5,027,742 | 7/1991 | Lee et al. | 118/300 |
| 5,171,613 | 12/1992 | Bok et al. | 118/667 |
| 5,290,827 | 3/1994 | Shine | 523/340 |
| 5,380,485 | 1/1995 | Talahashi et al. | 422/106 |
| 5,399,597 | 3/1995 | Mandel et al. | 523/342 |
| 5,407,267 | 4/1995 | Davis et al. | 422/111 |

FOREIGN PATENT DOCUMENTS

WO9409913  5/1994  WIPO .

OTHER PUBLICATIONS

Karen A. Larson et al., "Evaluation of Supercritical Fluid Extraction in the Pharmaceutical Industry," Biotechnology Progress, vol. 2, No. 2, Jun. 1986, pp. 73–82.

G A M Diepen et al, "The Solubility of Naphthalene in Supercritical Ethylene," Dec. 1948, pp. 4085–4089.

Mark McHugh et al., "Solid Solubilities of Naphthalene and Biphenyl in Supercritical Carbon Dioxide," Journal of Chemical Engineering Data, vol. 25, No. 4, 1980, pp. 326–329.

Hongju Chang et al., "Solubilities of Methoxy–1–tetralone and Methyl Nitrobenzoate Isomers and Their Mixtures in Supercritical Carbon Dioxide," Journal of Chemical Engineering Data, vol. 30, No. 1, 1985, pp. 74–78.

Ronald T. Kurnik et al., "Solubility of Solids in Supercritical Carbon Dioxide and Ethylene," Journal of Chemical and Engineering Data, vol. 26, No. 1, 1981, pp. 47–51.

Yu V. Tsekhanskaya et al., "Volume Changes In Naphthalene Solutions In Compressed Carbon Dioxide," Russian Journal of Physical Chemistry, vol. 40, No. 9, Sep. 1966, pp. 1152–1156.

Walter Cobbs et al., "High Solids Coatings Above 80% By Volume," presented at the Water–Borne & Higher Solids Coatings Symposium, Mar. 10–12, 1980, New Orleans, LA, pp. 175–192.

*Primary Examiner*—Timothy McMahon
*Attorney, Agent, or Firm*—Rankin, Hill, Lewis & Clark

[57] ABSTRACT

A control system for a process using supercritical fluid includes a reactor vessel including an agitator for mixing a batch of materials therein a source of supercritical fluid supplied to the reactor vessel, means for introducing into the reactor vessel batch material that is mixed in the presence of the supercritical fluid based on a selectable reaction process, process monitoring means for producing signals representative of the reaction in the reactor vessel; and control means for controlling the reaction in the reactor vessel based on said signals and the selected reaction process.

21 Claims, 15 Drawing Sheets

EVACUATE TANKS

| | |
|---|---|
| VACUUM SYSTEM (160) | ON |
| REACTOR TANK VACUUM VALVE (192) | OPEN |
| VACUUM PRESSURE SETPOINT (194) | CONFIRM |
| VACUUM TIMER SETPOINT | CONFIRM |
| VACUUM VALVE (192) | CLOSE |
| RECEIVER TANK VACUUM VALVE (196) | OPEN |
| VACUUM SETPOINT (194) | CONFIRM |
| VACUUM VALVE (196) | CLOSE |

$CO_2$ VAPOR FILL

| | |
|---|---|
| BOOSTER PUMPS OPERATIONAL (108) | CONFIRM |
| HIGH PRESSURE PUMPS OPERATIONAL (110) | CONFIRM |
| VAPOR FEED VALVES (162), (164), (200) | OPEN |
| VALVE (204) | CLOSE |
| REACTOR VESSEL (120) LIQUID FEED VALVE (116), (168) | OPEN |
| TRANSFER VALVE (142) | OPEN |
| REACH PRESSURE SETPOINT (212), (214), (180), (194) | CONFIRM |
| VAPOR FEED VALVES (162), (164) | CLOSE |
| TRANSFER VALVE (142) | CLOSE |

FIG. 6

$CO_2$ LIQUID FILL

| | |
|---|---|
| HEAT EXCHANGER SYSTEM (114) | ON |
| LIQUID FEED VALVES TO HIGH PRESSURE PUMPS (202), (198) | OPEN |
| RECIRCULATE VALVE (218) | OPEN |
| PURGE ROUTINE | INITIATE |
| PURGE COMPLETE | CONFIRM |
| HIGH PRESSURE PUMPS (110) | ON |
| REACTOR VESSEL (120) PRESSURE SETPOINT (182) | CONFIRM |
| LIQUID FEED VALVE (116) | CLOSE |
| PUMPS (110) | OFF |
| HEAT EXCHANGER (114) | OFF |
| BEFORE PURGE VALVE (218) (168) | CLOSE OPEN |

PURGE $CO_2$ GAS

| | |
|---|---|
| $CO_2$ RECIRCULATE VALVE (220), (218) | CLOSE |
| $CO_2$ FEED VALVES (202), (204), (166), (168) | OPEN |
| TEMPERATURE TRANSDUCER (182) = SETPOINT | CONFIRM |
| VENT VALVE (166) | CLOSE |

FIG. 8

REACT PHASE SEQUENCE

| | |
|---|---|
| PHASE AUTOMATIC TEMPERATURE CONTROL ROUTINE (FLUSH VALVE (144) AND REACTOR VESSEL (120) | INITIATE |
| SATISFY TEMPERATURE AND PRESSURE SETPOINT | CONFIRM |
| IF PRESSURE < SETPOINT | GO TO FILL |
| IF PRESSURE > SETPOINT | INITIATE MEDIA RECOVERY ROUTINE |
| AGITATION SYSTEM ROUTINE ON | CONFIRM |
| PHASE TIMER | ON |
| BATCH ADJUST ROUTINE (IF REQ'D) | CONFIRM |
| PHASE END | CONFIRM |
| PHASE NO. = SETPOPINT | GO TO DELIVERY |
| PHASE NO. ≠ SETPOINT | |
| PHASE NO. = SETPOINT + 1 | GO TO REACT PHASE SEQUENCE |

GO FILL $CO_2$ LIQUID

| | |
|---|---|
| PURGE ROUTINE | INITIATE |
| PURGE ROUTINE COMPLETE | CONFIRM |
| PUMPS (110) | START |
| VALVE (116) | OPEN |
| PRESSURE (180) = SETPOINT | CONFIRM |
| VALVE (116) | CLOSE |
| PUMPS (110) | OFF |

$CO_2$ RECOVERY ROUTINES $CO_2$ WILL BE RECOVERED WHERE ECONOMICAL IN REACT PLASE. $CO_2$ WILL BE RECOVERED AS A HIGH PRESSURE BLEED. THE ROUTINE FOR THIS IS AS FOLLOWS:

| | |
|---|---|
| WHEN REACTOR PRESSURE (180) > SETPOINT | CONFIRM |
| VALVES (170) AND (242) | OPEN |
| WHEN REACTOR PRESSURE (180) = OR < SETPOINT | CONFIRM |
| VALVES (170) AND (242) | CLOSE |

IN DELIVERY PHASE WHEN LIQUID FILL ROUTINE IS INITIATED. HIGH PRESSURE $CO_2$ RECOVERY ROUTINE (SECTION 2) IS IN EFFECT.
IN DELIVERY PHASE, IF RECEIVER TANK (140) BEGINS TO INCREASE IN PRESSURE ABOVE THE INITIALIZED SETPOINT CALL THE FOLLOWING ROUTINE:

| | |
|---|---|
| VALVE (254) | OPEN |
| IF RECEIVER TANK PRESSURE (212) EXCEEDS SETPOINT | CONFIRM |
| VALVE (216) | OPEN |
| WHEN RECEIVER TANK PRESSURE (212) = SETPOINT | CONFIRM |
| VALVE (216) | CLOSE |

$CO_2$ RECOVERY ROUTINE FROM REACTOR TANK (120)

| | |
|---|---|
| WHEN DELIVERY PHASE COMPLETE | CONFIRM |
| VALVES (254) AND (258) | CLOSE |
| VALVES (170) AND (242) | OPEN |
| WHEN REACTOR PRESSURE (180) = SETPOINT | CONFIRM |
| VALVE (242) | CLOSE |
| VALVE (220) | CLOSE |
| VALVE (258) | OPEN |
| WHEN REACTOR PRESSURE (180) = SETPOINT | CONFIRM |
| VALVES (170) AND (278) | CLOSE |

$CO_2$ RECOVERY FROM RECEIVER TANK (140)

| | |
|---|---|
| RECOVERY FROM REACTOR TANK (120) COMPLETE (ABOVE) | CONFIRM |
| VALVE (260) | OPEN |
| WHEN RECEIVER TANK PRESSURE = OR < SETPOINT | CONFIRM |
| VALVE (260) | CLOSE |

BATCH ADJUST

| | |
|---|---|
| BATCH ADJUST REQUIRED | CONTINUE |
|   IF YES | GO TO BATCH |
|   IF NO | ADJUST SEQUENCE |
| BATCH ADJUST TRANSFER VALVES CLOSED (176), (178) | CONFIRM |
| CHECK PRESSURE (244) | CONFIRM |
| BATCH ADJUST VESSEL VALVE (246) PRESSURE = 0 | OPEN |
|   IF 0 | |
| BATCH ADJUST CHARGE VALVE (248) | OPEN |
| BATCH ADJUST (150) | ENTER |
| BATCH ADJUST CHARGE VALVE (248) | CLOSE |
| VAPOR FILL SEQUENCE | INITIATE |
| VAPOR FILL VALVE | CLOSE |
| PRESSURE SETPOINT | GO TO BATCH ADJUST LIQUID FILL |
| REACTOR PRESSURE (180), (244) (ACTUAL) + 300PSI EQUALS BATCH ADJUST LIQUID FILL | CONFIRM |
| VALVE (252) | CLOSE |
| BATCH ADJUST TRANSFER VALVES (176), (178) | OPEN |
| VALVES (176), (178) | CLOSE |
| BATCH ADJUST PRESSURE = REACT PRESSURE (ACTUAL) | CLOSE BATCH ADJUST TRANSFER VALVES |
| BATCH ADJUST VESSEL VENT SEQUENCE | INITIATE |
| VALVE (246) | OPEN |

FIG. 11

DELIVERY

| | |
|---|---|
| RECEIVER VESSEL PRESSURE = SETPOINT (140) | CONFIRM |
| IF PRESSURE > SAFETY SETPOINT (216) | OPEN |
| IF PRESSURE < SETPOINT (164) | OPEN |
| WHEN PRESSURE < OR = TO SETPOINT CLOSE (164) AGITATION RATE (130) | ADJUST |
| $CO_2$ LIQUID FILL SEQUENCE | INITIATE |
| PRESSURE ASSIST ROUTINE ON/OFF | CONFIRM |
| $CO_2$ RECOVERY ROUTINE – IF ON GO TO ROUTINE | INITIATE |
| RECEIVER VESSEL DELIVERY BACK PRESSURE CONTROL SEQUENCE | INITIATE |
| REACTOR FLUSH – VALVE (144) | OPEN |
| – VALVE (142) | OPEN |
| IF REACTOR PRESSURE (120) RATE OF CHANGE = SETPOINT – VALVES (142) AND (254) | CLOSE |

DELIVERY PRESSURE CONTROL

| | |
|---|---|
| RECEIVER TANK PRESSURE SETPOINT (212) | CONFIRM |
| REACTOR (120) FLUSH VALVE (144) | OPEN |
| TRANSFER VALVE (142) | OPEN TO INITIAL DELIVERY POSITION |
| RECEIVER TANK PRESSURE SETPOINT (212) | CONFIRM |
| VALVE (254) | OPEN |
| RECEIVER TANK PRESSURE > SETPOINT (212) | MODULATE VALVE (142) |

DEPRESSURIZATION

REACTOR

| | |
|---|---|
| REACTORS (120), (140) DEPRESSURIZATION SETPOINT | CONFIRM |
| VALVE (254) | CLOSE |
| REACTOR VALVE (242) TO $CO_2$ RECOVERY | OPEN |

DEPRESSURIZATION CONTROL

| | |
|---|---|
| VALVE (242) SEQUENCE | INITIATE |
| REACTOR (120) PRESSURE = SETPOINT I. VALVE (166) | CLOSE |
| VALVE (258) | OPEN |
| REACTOR (120) PRESSURE = SETPOINT II. VALVES (170), VALVES (170), (258) | CLOSE |
| VALVE (188) | OPEN |

RECEIVER TANK (140)

| | |
|---|---|
| RECEIVER PRESSURE (212) = DEPRESSURIZATION SETPOINT | CONFIRM |
| VALVE (220) | CLOSE |
| VALVE (260) TO COMPRESSOR (122) | OPEN |
| RECEIVER PRESSURE (212) = SETPOINT. VALVE (260) | CLOSE |
| VALVE (216) | OPEN |

FIG. 14

CONTROL SYSTEM FOR PROCESSES USING SUPERCRITICAL FLUIDS

This application is a continuation of application(s) Ser. No. 08/438,681 filed on May 10, 1995 now abandoned.

BACKGROUND OF THE INVENTION

The invention relates generally to apparatus for monitoring and controlling a process that uses supercritical fluids, such as, for example, a process for preparing coating materials as described in U.S. Pat. No. 5,399,597 the entire disclosure of which is fully incorporated herein by reference. More specifically, the invention relates to a process control system that automatically controls a supercritical process including control of fluid flow, reaction process control and delivery control of the finished reactants.

Although control systems are generally known and utilize such improvements as microprocessors and other advanced solid state technologies, known control systems are not suitable for extension to control of a plurality of processes that use supercritical fluids. For example, known control system involving fluids typically have set fluid flow parameters, suitable for use with a single specifically designated process. It is desirable to provide a system that can readily accommodate a number of different processes, each of which may have its own operational requirements. Each reaction process may also exhibit a number of different phases or regimes that necessitate real time process control and adjustment, particularly at high temperatures and pressures. Additionally, there are no known system control applications in the area of processes using supercritical fluids. Further control problems arise in applications for processing large batches, for example, on the order of 15,000 to 20,000 pounds or more of starting material. Such a desired automated control system should also be compatible with a backup manual control function.

SUMMARY OF THE INVENTION

To the accomplishment of the foregoing objectives, the invention contemplates, in one embodiment, a control system for a process using supercritical fluid, comprising a reactor vessel including an agitator for mixing a batch of materials therein; a source of supercritical fluid supplied to the reactor vessel; means for introducing into the reactor vessel a number of batch materials that are mixed in the presence of the supercritical fluid based on a selectable reaction process; process monitoring means for producing signals representative of the reaction in the reactor vessel; and control means for controlling the reaction in the reactor vessel based on said signals and the selected reaction process.

These and other aspects and advantages of the present invention will be readily understood and appreciated by those skilled in the art from the following detailed description of the invention with the best mode contemplated for practicing the invention in view of the accompanying drawings.

BRIEF DESCRIPTION OF THE DRAWING

FIGS. 4–14 are detailed representative flow diagrams for the various routines and subroutines referenced in FIG. 1.

DETAILED DESCRIPTION OF THE INVENTION

Figure 1:
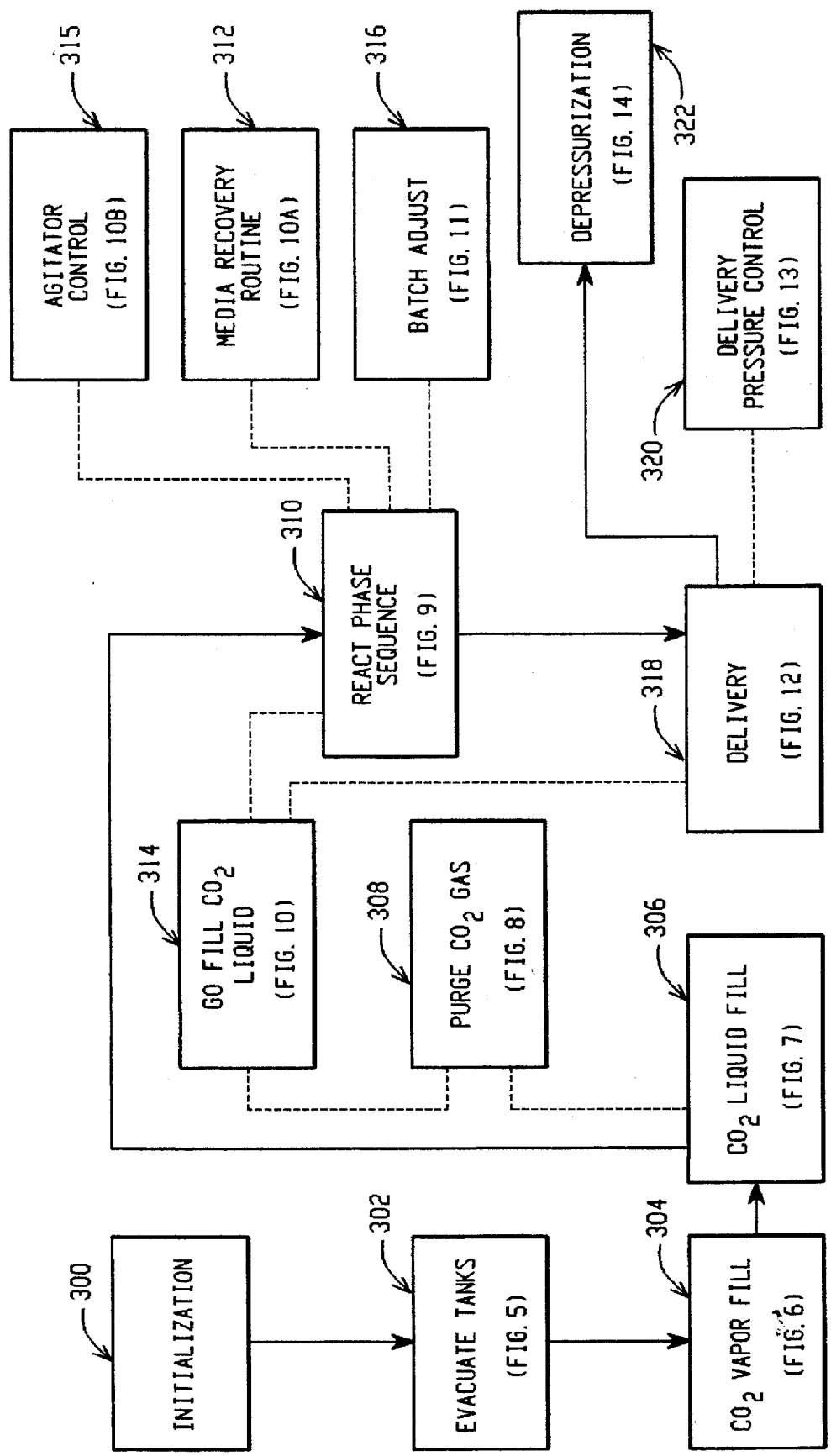
FIG. 1 is simplified functional block diagram of a control system embodying the present invention.

With reference to FIG. 1, there is illustrated a functional block diagram for a control system generally designated with the numeral 100 in the other drawings, such a system being particularly suited for controlling a process that uses a supercritical process media such as, for example but not limited to, carbon dioxide. Although the control system 100 is described herein with particular reference to a reaction process for making coating powders using supercritical carbon dioxide process media, such description is intended to be exemplary in nature and should not be construed in a limiting sense. Those skilled in the art will readily appreciate that the invention can be used with different and selectable process media and reaction processes. A particular advantage of the present invention is that the control system can accommodate many different reaction processes by convenient programming. As used herein, the term "reaction process" is used in its broadest sense to refer to any process involving the mixing of starting material in the presence of a supercritical process media.

A significant aspect of the invention is that, while the control system 100 preferably is used for automated control of a reaction process, it is also compatible with a manual operation, which operation is facilitated by the data acquisition and control functions of the system.

With reference to FIG. 1, the control system 100 is configured to carry out a number of monitoring and control functions, which for clarity and ease of explanation have been grouped together into various control routines and subroutines indicated by the various functional blocks in the drawing. A detailed explanation of the operations in FIG. 1 will best be understood in view of an accompanying description of one embodiment of a physical implementation of such a control system, such as the schematic representation illustrated in FIGS. 3A–3C. As such, a general description of the various system components and assemblies in FIGS. 3A–3C will be provided first, then a more detailed description will follow in conjunction with the description of FIG. 1.

Figure 3A:
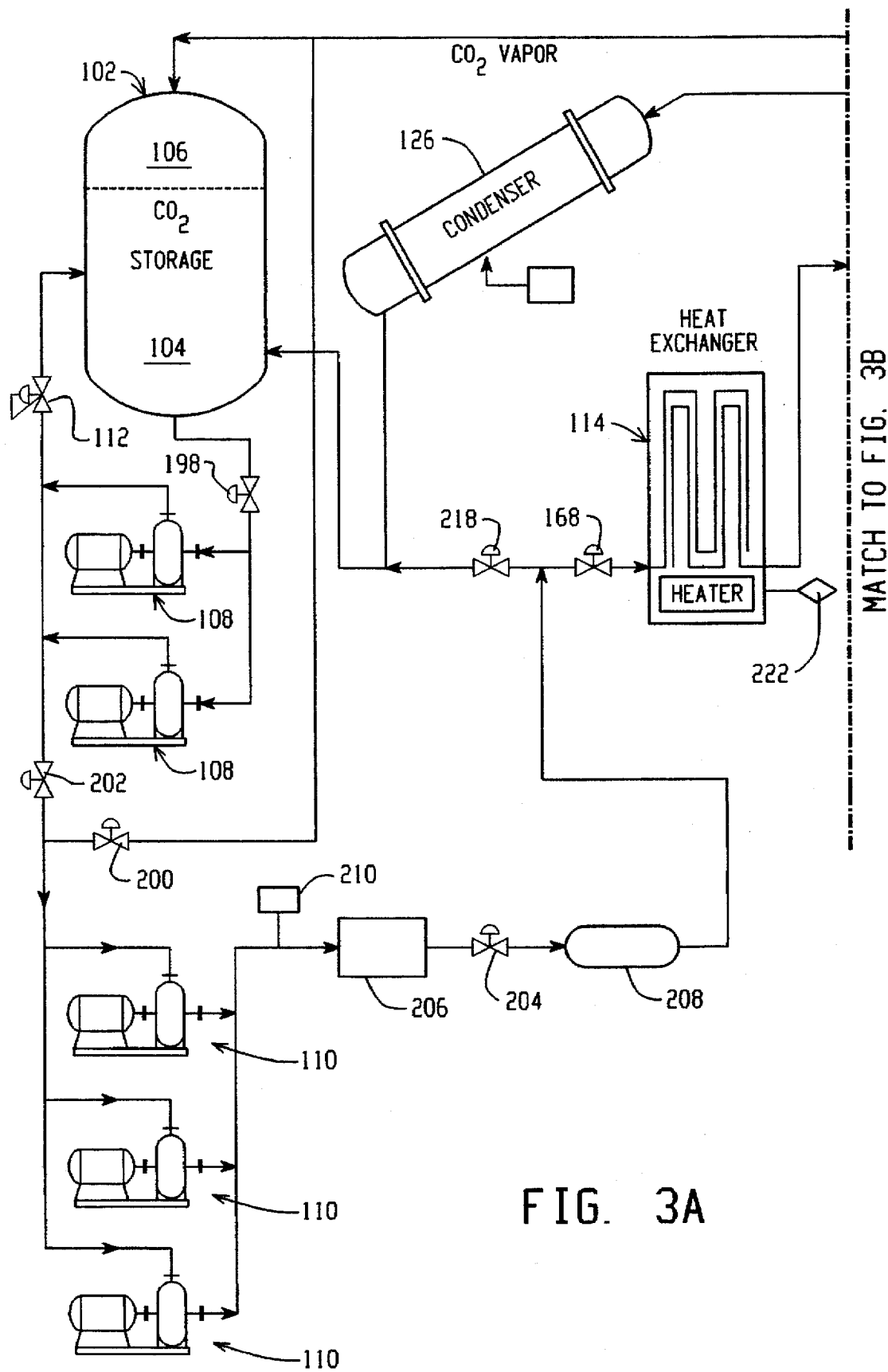
FIGS. 3A–3C are schematic diagrams of a process control apparatus embodying the concepts of the present invention.
Figure 3B:
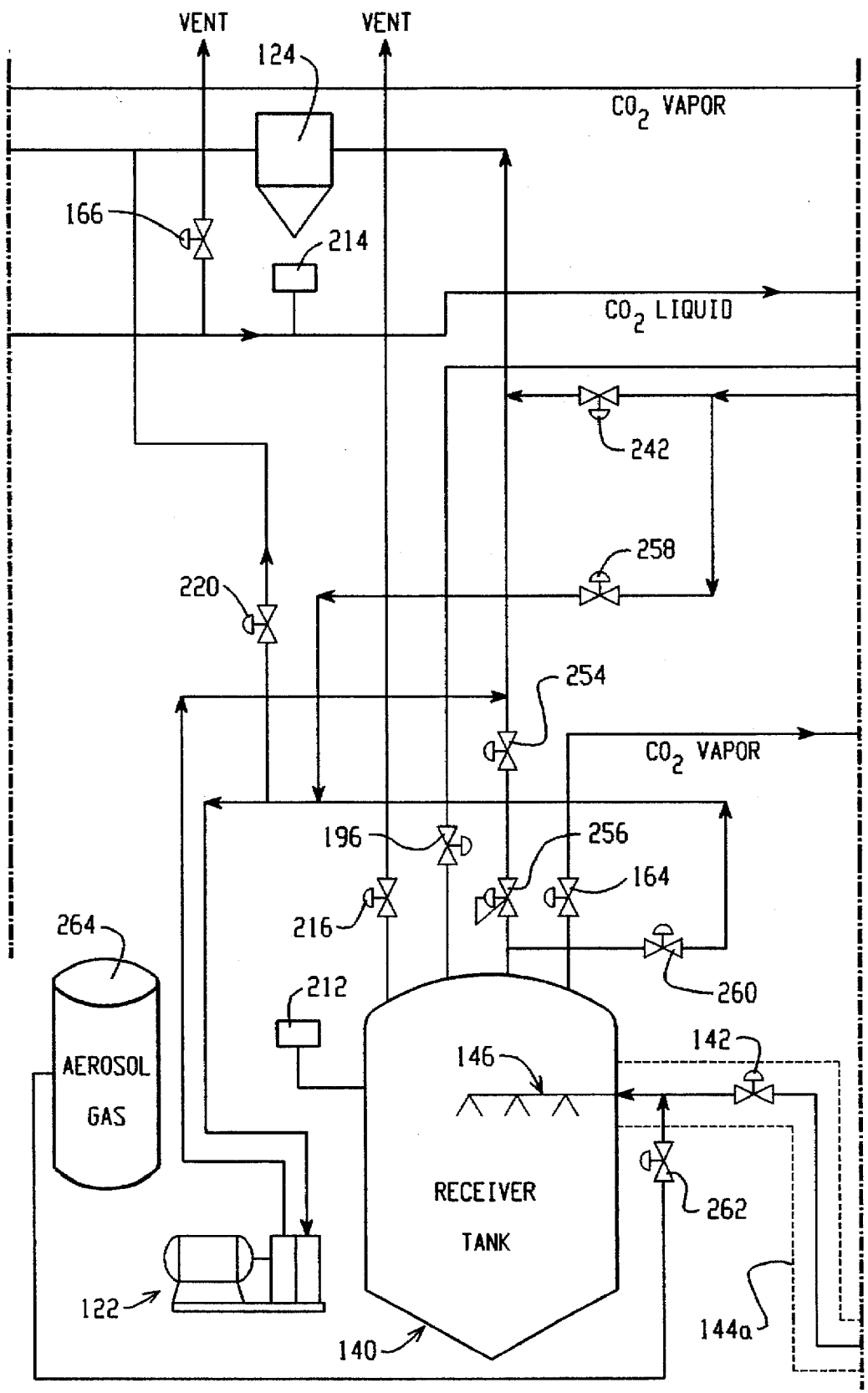
Figure 3C:
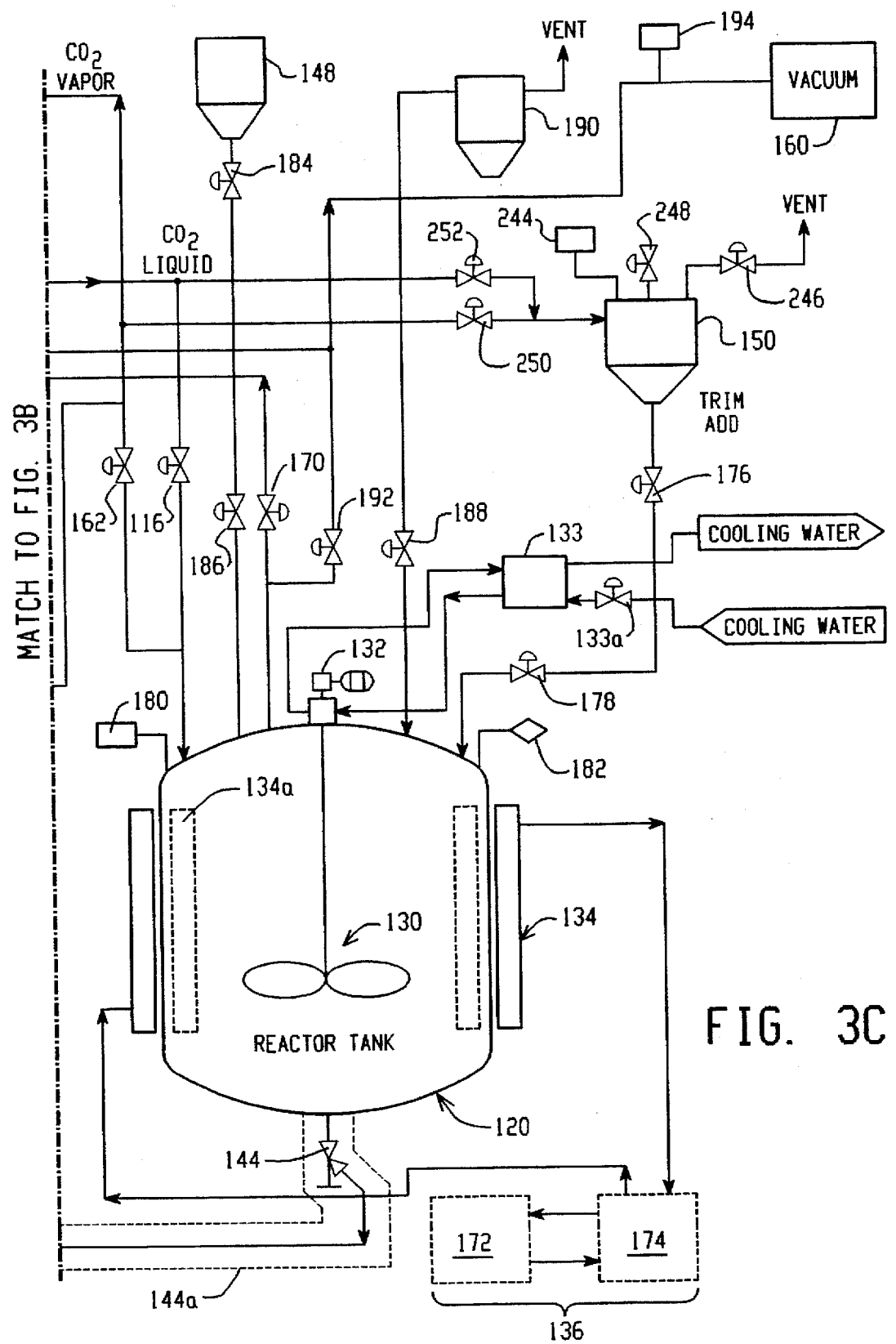
Figure 4:
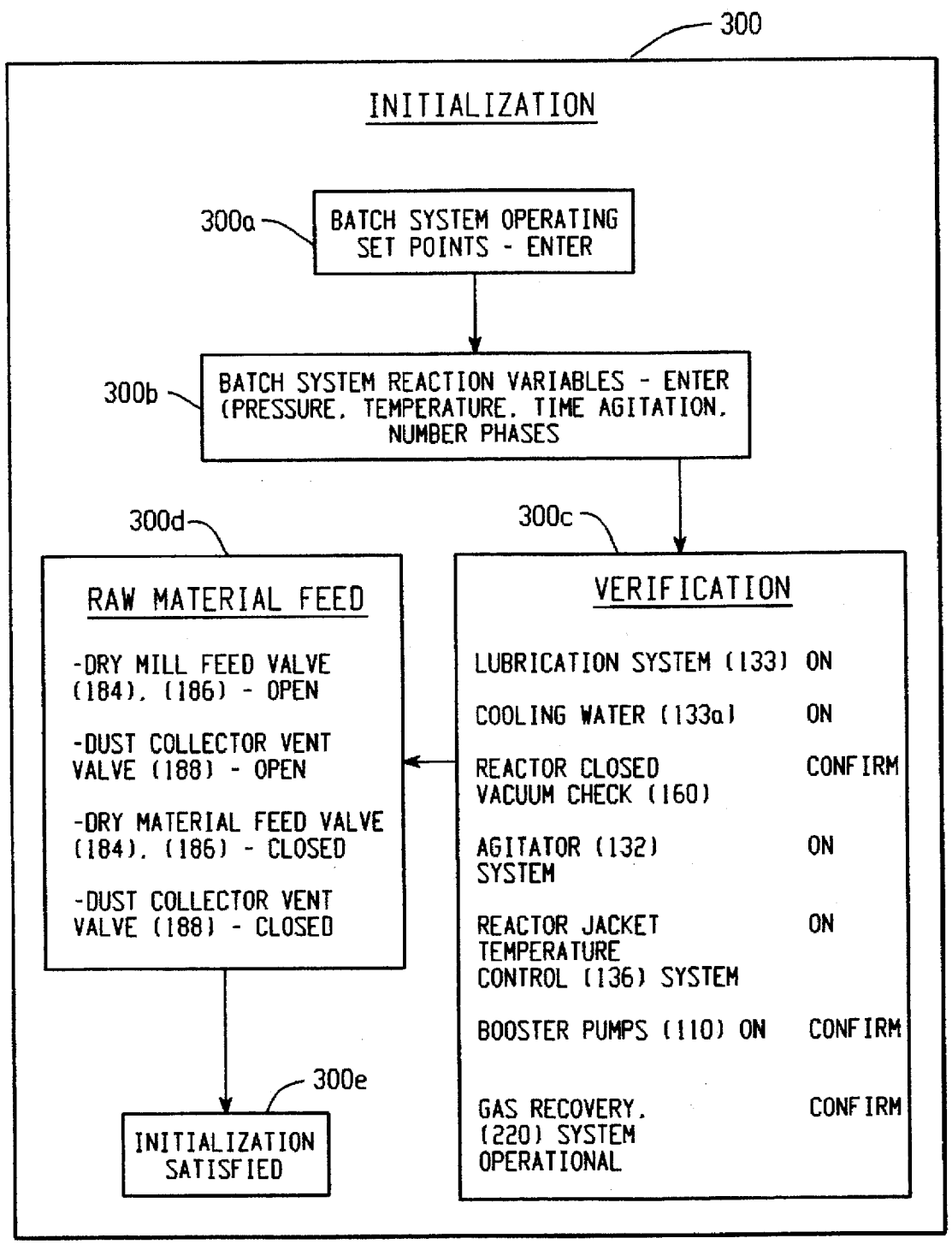
Figure 10B:
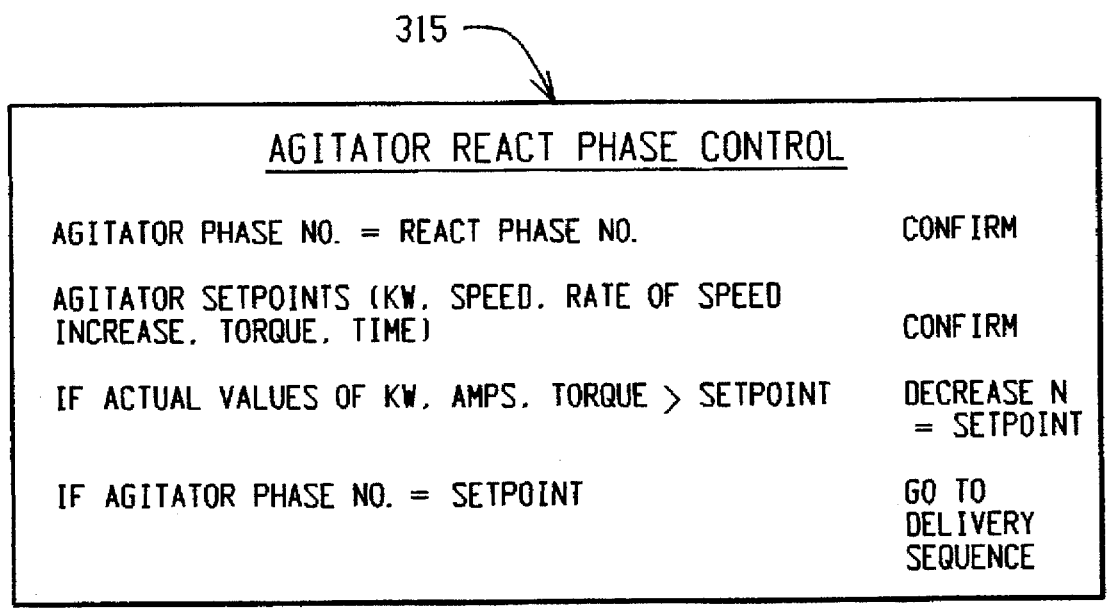

In FIGS. 3A–3C, a suitable process control system apparatus 100, for a process that uses a supercritical fluid as a process media, includes a number of mechanical assemblies such as tanks, a number of control devices such as valves, heat exchangers and sensors and an electronic controller (FIG. 4). For clarity of FIGS. 3A–3C, the controller is separately illustrated in FIG. 4, and those skilled in art will readily understand that the controller is interfaced in any suitable and convenient manner to the various sensors and control devices in the system 100. Such connections may be hardwired connections, or could further include telemetry, optics or other conveniently available interface operations. Typically, the controller of FIG. 4 will be physically located in a control area remote from the actual process machinery, but such is not required if specific application requirements dictate otherwise. Thus, the directional arrows and lines in FIGS. 3A–3C represent fluid piping and flow, not electrical connections.

The process control system 100 includes a storage container 102 used to receive and store a suitable process media 104, for example, $CO_2$. The container 102 may be conventional in design and is used to store the media in liquid form although there typically will be a vapor ullage 106 at the top of the container.

One or more booster pumps 108, such as pump no. CRL11/2 available from Blackmer, are used to deliver liquid media to a series of one or more high pressure pumps 110, such as pump no. PO3.5-150CC02 available from HYDRO-PAC. The booster pumps 108 are also used with a back pressure regulator valve 112 to insure constant delivery pressure of fluid.

The high pressure pumps 110 are used to deliver the liquid media 104 to a reactor tank or vessel 120 (FIG. 3C) via a heat exchanger 114 (FIG. 3A) and a liquid feed valve 116 (FIG. 3C). The heat exchanger 114 can be used to control the temperature of the liquid prior to passing into the reactor tank 120 as part of the process control for using a supercritical process media.

A compressor 122 is used with a recovery filter 124 and condenser 126 to recover process media vapor during and after a reaction process is completed.

The reactor tank 120 includes an internal agitator 130 driven by a motor 132, such as an electric motor. The agitator may include a cooled lubrication system 133, because agitator operation could involve several hours depending on the selected reaction process being carried out. The reactor tank is further equipped with a heat/cool jacket 134 connected to a heat transfer media such as brine, or other suitable fluid, temperature control unit 136. The heat transfer media is used for cooling, and additionally the reactor tank can be provided with band heaters for adding heat to the reactor tank 120. The reactor tank 120 can be provided with internal or external heaters/coolers or any combination thereof. The external heat exchange jacket 134, internal jacket 134a, along with the heat exchanger 114 can be used to control the reaction process to maintain a supercritical fluid state, as well as the specified temperature and pressure parameters associated with the selected reaction process.

A receiver tank 140 is connected to the reactor tank 130 via a transfer valve 142 and a flush valve 144. The receiver tank 140 is equipped with a number of spray nozzles 146, or a direct tube or flange connection, for example, used for high pressure and velocity delivery of the finished process from the reactor tank 120 to the receiver tank 140. Although not shown in the drawings, the receiver vessel can be equipped for removing the finished product from the receiver and/or delivering the finished product to another vessel or receptacle. The $CO_2$ recovery process can be used to recovery the process media from both the receiver tank and the reactor tank.

A starting material hopper 148 is provided for holding and feeding material to the reactor tank 120. Another hopper 150 is used to hold a supply of material that can be added to the reactor vessel 120 under pressure during a trim add operation, as will further be described below.

Figure 2:
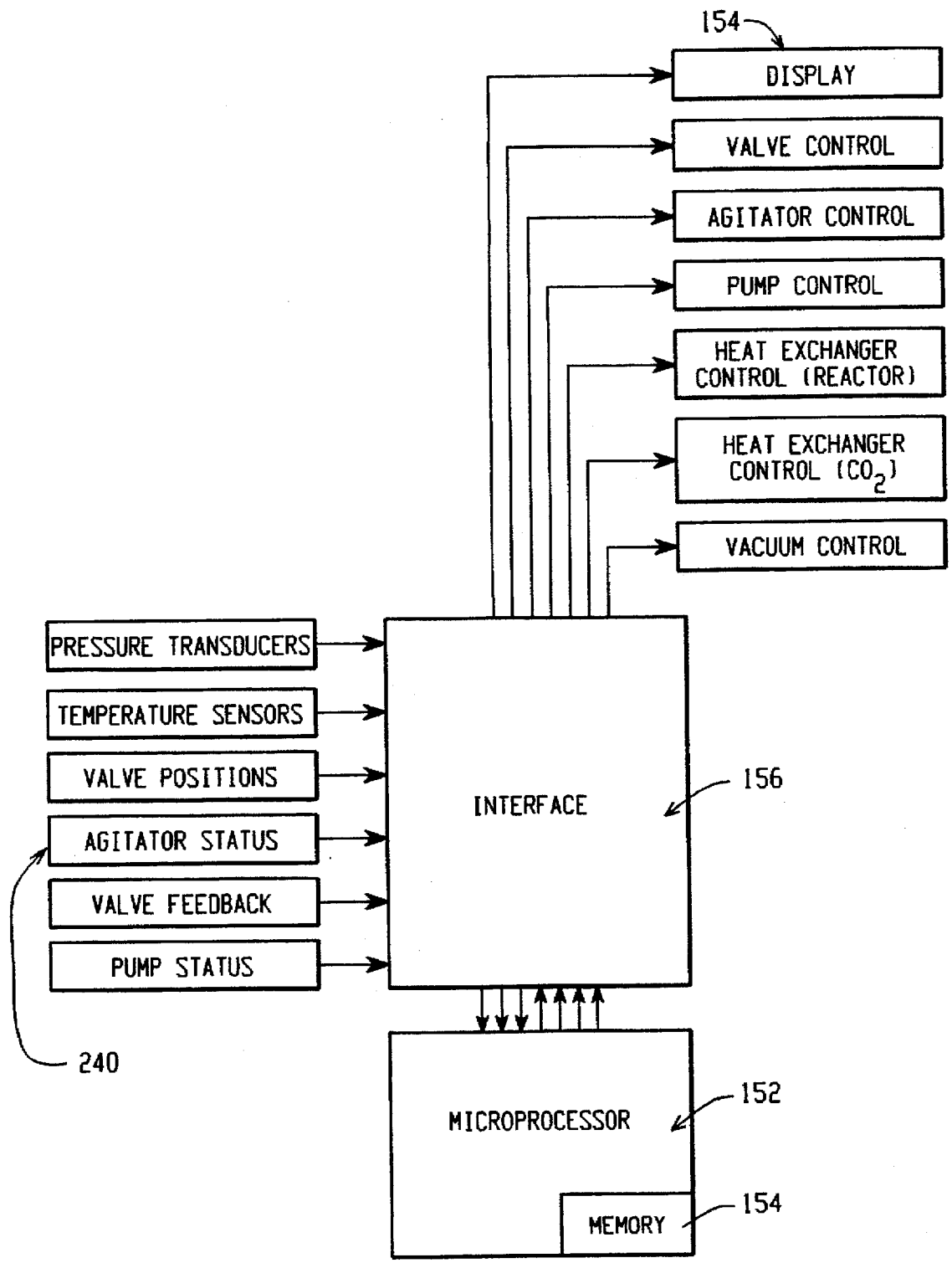
FIG. 2 is a schematic diagram in functional block diagram form of a controller suitable for use with the apparatus of FIGS. 3A–3C to carry out the functional routines identified in FIG. 1.

FIG. 2 provides a functional block diagram of a processor controller suitable for use with the present invention. In the exemplary embodiment, a central processor 152 is used for receiving and sending various process monitoring inputs and control signals respectively. The controller can include an on-chip memory arrangement 154 and/or additional memory devices connected thereto. A suitable microprocessor is part no. 545-1101 available from Siemens, and the controller can be programmed in a conventional manner according to the manufacturer's specifications to incorporate the process control functions of the present invention. Alternatively, as another example, commercially available computer systems can be provided with applications software to carry out the present invention. Because many of the sensors and control devices such as temperature sensors, pressure transducers, motor controls and so on associated with the control system 100 can require any number of signal conditioning circuits, an interface control 156 can be provided as needed to condition input signals to the microprocessor and for providing appropriate control signals to the various components of the system 100.

The various functions identified in FIG. 2 are intended to be representative for the exemplary embodiment described herein and should not be construed in a limiting sense. Those skilled in the art will readily understand and appreciate that the specific monitoring and control functions carried out by the system controller 152 can be application specific and further the system can be programmed to self-configure various control and monitoring devices in the system 100 depending on the selected and available reaction processes to be carried out. In accordance with the teachings of the invention, however, we have found certain monitoring and control functions to be advantageous particularly for reaction processes that use supercritical fluid process media, as will be described in greater detail below. It will further be appreciated that the controller 152, which as illustrated in FIG. 2 may include one or more displays, such as for example a conventional video display terminal, can conveniently be used for process monitoring and display in conjunction with a manual operation of the system 100. The various process monitoring devices, such as pressure transducers, can also be equipped to provide local visual readout as a backup and confirmation function should the microprocessor automated control be interrupted or lost or otherwise become suspect. The controller can also be used to record data such as on magnetic recording devices, optical storage devices, charts and so on to provide an historical record of various process parameters through a reaction process.

With reference next to FIG. 1, and further in view of FIGS. 3A–3C, the following is a general description of an exemplary control process embodying the concepts of the present invention. A detailed description of the control routines will then be provided.

The first routine 300 is an INITIALIZATION routine during which the operator enters various process parameters into the system for the selected reaction process. These parameters and inputs may include batch size, material compositions, pressure and temperature settings, reaction times, number of phases and so on. The controller 152 can also be programmed to store or otherwise access from a memory device such reaction process parameters if so desired. During initialization, the controller 152 verifies that the various subsystems are operational, such as the agitator lubrication system, pumps, cooling jacket, gas recovery system and so forth. After verifying the system is ready to proceed, the operator feeds the starting material into the reactor tank 120 and the reactor tank 120 is then closed and verified to be closed.

After INITIALIZATION 300, an EVACUATE TANKS routine 302 is executed to evacuate the reactor tank 120 and the receiver tank 140, and also checks that the system is free of leaks. A vacuum system is activated to pull a vacuum in the tanks 120, 140 to reduce system contamination caused by moisture in the atmosphere introduced during material feed (prior to tank closure) or by moisture introduced during maintenance and cleaning, or moisture associated with the raw starting materials. This step also removes atmospheric gases from the system.

Following tank evacuation, the system 100 enters a VAPOR FILL routine 304. In this embodiment, use of a process media such as $CO_2$ in a supercritical process as described herein involves pumping liquid media from the storage tank 104 to the reactor tank 120. If the system is at atmospheric pressure, the pressurized liquid carbon dioxide will expand and likely cause substantial icing throughout the system at various valves, piping and heat exchangers. To reduce this effect, the VAPOR FILL routine 304 is used to back pressure the system with vapor prior to introducing the liquid process media into the system. First the pumps are "bumped" to verify pump operation and a pressure rise in the system. Then, a vapor feed valve 162 to the reactor tank 120 and a vapor feed valve 164 to the receiver tank 140 are opened. The tanks can be pressurized together by also opening the valves 142, 144 connecting the tanks 120, 140. Back pressure is regulated using the booster pumps 108, regulating valve 112 and pressure transducers for feedback control. The tanks 120, 140 are vapor filled to a back pressure of 300 psi, for example, with the back pressure value being selected for the selected reaction process. In this exemplary embodiment, the ullage pressure in the storage tank 102 typically is at a nominal 300 psi and it is this pressure that is used for the back pressure operation. The ullage pressure in the tank 102 will vary, however, with volume and temperature of media in the tank 102 but such pressure variations should not adversely affect the efficacy of the back pressure operation. After back pressure is reached, the vapor feed valves 162, 164 and the control valves 142, 144 are closed to seal the system at the selected back pressure.

After VAPOR FILL, the system 100 carries out a LIQUID FILL routine 306. During this routine, vapor at the high pressure pumps 110 is first purged using a PURGE subroutine 308. This PURGE operation is effectively used to prime the high pressure pumps 110 with liquid only. The back fill vapor is vented through a vent valve 166 with a liquid feed valve 168 to the heat exchanger 114 in the open position. The pumps 110 deliver the process media 104 to the reactor tank 120 until the pressure setpoint for the reaction is reached. Pressure and temperature of the reaction are regulated to achieve a supercritical state of the process media within the reaction tank 120 according to the selected reaction process as described, for example, in the above-referenced patent.

Control of the reaction is accomplished during a REACT PHASE SEQUENCE routine 310. During this routine, pressure, temperature and agitator speed are controlled to effect the selected reaction. In general, pressure in excess of the current setpoint can be reduced by executing a REACTOR VENT routine 312 using a reactor vent valve 170 through which vented process media vapor is recovered. If pressure is below the current setpoint, the system enters a GO FILL subroutine 314, by which additional process media can be injected into the reactor tank 120 via the liquid feed valve 116. Pressure and temperature are further regulated by control of the heating/cooling jacket 134, 134a using the band heaters and brine chiller 172 (or other suitable fluid) and temperature regulator 174 (part of the temperature control unit 136) that locally regulates the vessel temperature via the jacket 134 based on command signals from the controller 152. Furthermore, at anytime during the reaction process a BATCH ADJUST 316 subroutine can be called for adding material to the reaction through batch adjust transfer valves 176 and 178. This delivery of material is performed under pressure due to the high pressure inside the reactor tank 120. A reactor pressure transducer and a reactor temperature transducer, both of which can conveniently be conventional in design, are used to provide the controller 152 real time feedback during the reaction process.

After the reaction process is completed, the system 100 carries out a DELIVERY subroutine 318 by which the finished reaction product is sprayed into the receiver tank 140 at high velocity via the nozzles 146. A DELIVERY PRESSURE CONTROL subroutine 320 is used to control the receiver tank pressure by modulating delivery of material through the transfer valve 142. Pressure in the receiver tank 140 can also be controlled by controlling the agitator speed and calling the GO FILL subroutine 314 to add more media during delivery. Further processing of the delivered final product in the receiver tank 140 can be carried out in any number of selected techniques and forms no particular part of the present invention. After delivery is completed, the system 100 is depressurized using a DEPRESSURIZATION routine 322.

A more detailed description of the various routines of FIG. 1 will now be provided in view of FIGS. 4–13 and 3A–3C. These routines are intended to be exemplary in nature, and those skilled in the art will readily appreciate that the specific control functions will be determined by the application specific implementation of the invention and the particular requirements of each selected reaction process.

The INITIALIZATION routine 300 in FIG. 4 begins with the operator entering at step 300a the various batch system operating setpoints for the selected reaction process, such as the number of impeller blades on the agitator for the batch, the blade types, an instruction if aerosoling gas will be used (for improving atomization), agitator torque control setpoint if any, maximum agitator speed and current setpoints, initial agitator speed setpoint, setpoint at which agitator speed control is switched to torque control (this setpoint can be based on reaction temperature, pressure, viscosity, phase number and so on). At step 300b the operator enters the reaction variables for the selected reaction process to be carried out. Such variables can include the reaction pressures, temperatures, number of phases in the process, agitator time and so on. These variables are selected empirically based on test batches, or can be estimated for test purposes and so on. An advantage of the system 100 is that it permits any number of variables to be changed as well as a wide selection of available processes all with the convenience of keyboard data entry. In the exemplary embodiment herein, by including selectable control of the agitator, temperature and pressure of the process media 104 and the capability of adding media and other materials the reactor tank during a mixing process under pressure, the system 100 is highly flexible in accommodating a wide range of selectable reaction processes.

The system next enters a verification or diagnostics loop 300c that serves as an automated self-test of the various subsystems (as identified in the drawing) used in the process control apparatus 100. Again, this list is intended to be exemplary in nature as to key components in the overall system, with additional checks available if so desired or needed for a specific application. For example, a typical system controller would conduct a self-test of the electronics, and further could conduct tests of the various sensors and transducers. Note in the loop 300c that the agitator lubrication system and cooling system through a flow valve 133a must be operational before the agitator is tested.

After the system 100 passes the verification loop 300c, the reactor tank 120 is hydraulically raised and sealed closed. Proper closure of the tank 120 can be verified with an electrical signal from a conventional contact switch, for example. Due to the high pressures in the reactor tank 120 during a reaction process, external pressure can be provided around the reactor vessel seals to prevent the seals from extruding during a reaction. With the reactor tank 120 closed, at loop 300d the starting material located in the hopper 148 is fed to the reactor tank 120 through dry feed valves 184 and 186. Additional hoppers can be used if so desired. While the starting material is fed into the reactor tank 120, a dust collector vent valve 188 is open. After the operator has weighed out the starting material and transferred it to the reactor tank 120, the tank is closed, and the dry feed valves 184, 186 and vent valve 188 are closed. Initialization is verified complete at step 300e.

After INITIALIZATION, the system 100 begins the EVACUATE TANKS routine 302 set forth in FIG. 5. The vacuum system 160 is turned on, and a reactor tank 120 vacuum valve 192 is opened. A vacuum is pulled in the reactor tank 120 until a vacuum pressure transducer 194 reaches a vacuum pressure setpoint within a vacuum timer setpoint. If these conditions are met, the reactor tank vacuum valve 192 is closed and a receiver tank 140 vacuum valve 196 is opened. A vacuum is pulled in the receiver tank until the receiver tank pressure setpoint is reached as indicated by the vacuum pressure transducer 194. Evacuating the tanks 120, 140 helps reduce moisture and atmospheric gases in the system prior to starting a reaction.

After EVACUATE TANKS is completed, the system begins the VAPOR FILL routine 304 set forth in FIG. 6. In the exemplary embodiment described herein, supercritical carbon dioxide is used as the process media 104. For convenience, the $CO_2$ vapor from the storage tank 102 can be used for the back pressure vapor fill procedure. Use of another gas during this procedure is not precluded, however, those skilled in the art will appreciate that using the vapor of the process media is more convenient than injecting a second media into the system 100.

Those skilled in the art will appreciate that the microprocessor-based system allows for extensive process monitoring and data collection activity. This can include, for example, pressure data from the pressure transducers, temperature data, agitator data including speed, torque and amperage (power), vapor and liquid mass flow (volume and mass) delivered with respect to time, valve actuation histories, valve position histories for modulated valves, pump run histories and so on to name a few. The data actually collected and used during a selected reaction process will be determined by each particular application.

The VAPOR FILL sequence 304 begins by bumping the booster pumps 108 and high pressure pumps 110 with all valves closed to verify an initial pressure build. The VAPOR FILL sequence is preferably done in steps. A booster pump inlet valve 198 is opened, as is a vapor feed valve 200 between the storage tank 102 and the high pressure pumps 110. This vapor pressurizes the system piping between the booster pumps 108 and the high pressure pumps 110. A liquid feed valve 202 between the booster pumps 108 and the high pressure pumps 110 is closed during the back pressure vapor fill operation. Also, another liquid feed valve 204 between the high pressure pumps 110 and the heat exchanger 114 is also closed during the back pressure operation. Note that a conventional liquid mass flow meter 206 is provided for measuring delivery quantity and rate of the process media. An accumulator 208 can also be provided to serve as a pulsation damper for liquid delivered by the high pressure pumps 110. A pressure transducer 210 is provided for monitoring pressure at the high pressure pumps 110 outlet on the high pressure side. A pressure transducer 212 is also provided for the receiver tank 140, and a pressure transducer 214 is provided in the liquid feed piping downstream of the heat exchanger 114 outlet.

In order to back pressure the reactor tank 120, reactor vapor feed valve 162, reactor liquid feed valve 116 and heat exchanger feed valve 168 are opened. This results in vapor back pressure of the reactor vessel 120, the accumulator 208 and all piping from the high pressure side of the high pressure pumps 110 to the reactor vessel 120. Pressure transducers 180 and 214 are monitored to confirm the reactor tank 120 and high pressure feed lines back pressure setpoint, for example 300 psi, is reached. The pressure indicated by transducer 210 can also be monitored at this time to verify pressure is maintained on the pump side of valve 204. If the pressure readings are within the setpoint limits, then the reactor vapor feed valve 162 is closed and the receiver tank vapor feed valve 164 is opened as is the transfer valve 142. This pressurizes the receiver tank 140 and the piping between the receiver tank 140 and the reactor tank 120 to the flush valve 144 which remains closed during this time. The system also verifies that a receiver tank vent valve 216 is closed. Again, the various pressure transducers, including the receiver tank pressure transducer 212 are used to verify that the back pressure setpoint is reached. If so, the vapor feed valves 162, 164 and 200 are closed, and the transfer valve 142 is also closed to complete the VAPOR FILL sequence. Although not shown in the drawings, one or more vapor flow meters can be provided as needed to measure the quantity and mass of vapor used to back pressure the system.

After the system is back pressured with vapor, the system begins the LIQUID FILL routine 306. An important aspect of the LIQUID FILL routine is a purge operation which also serves to prime the high pressure pumps with liquid prior to filling the reactor tank 120 with liquid. The routine begins with confirming the heat exchanger system 114 is on and that the liquid feed valves 198, 202 are open, as well as a liquid tank recirculation valve 218. The system then calls for the PURGE subroutine 308 listed in FIG. 8. During PURGE, the tank recirculation valve 218 and another recirculation valve 220 for the condenser 126 are closed and the liquid feed valves 202, 204 and 168 are open. The vent valve 166 is also open. This permits the back pressure vapor to be vented out of the system on the input side to the heat exchanger, and liquid media 104 fills the piping through the high pressure pumps 110, the accumulator 208 and the heat exchanger 114. Icing is avoided due to the back pressure imposed initially on the system. Note that during this time the main liquid feed valve 116 to the reactor tank is closed. The system verifies that liquid has filled to the heat exchanger by monitoring the temperature using a temperature sensor 222 at the heat exchanger 114. When the sensor 222 verifies that the temperature is at the setpoint (indicating liquid in the system), then the vent valve 166 is closed and the system returns to the LIQUID FILL routine 306.

After PURGE is complete, the high pressure pumps 110 are turned on and the liquid feed valve 116 to the reactor tank is opened, thus permitting liquid to enter the reactor tank 120. With the high pressure pumps 110 on, the process media 104 is pumped into the reactor tank 120 until the pressure setpoint is reached as indicated by the pressure sensor 180. The liquid feed valve 116 is then closed, the high pressure pumps 110 are turned off, the heat exchanger 114 is off.

Figure 15:
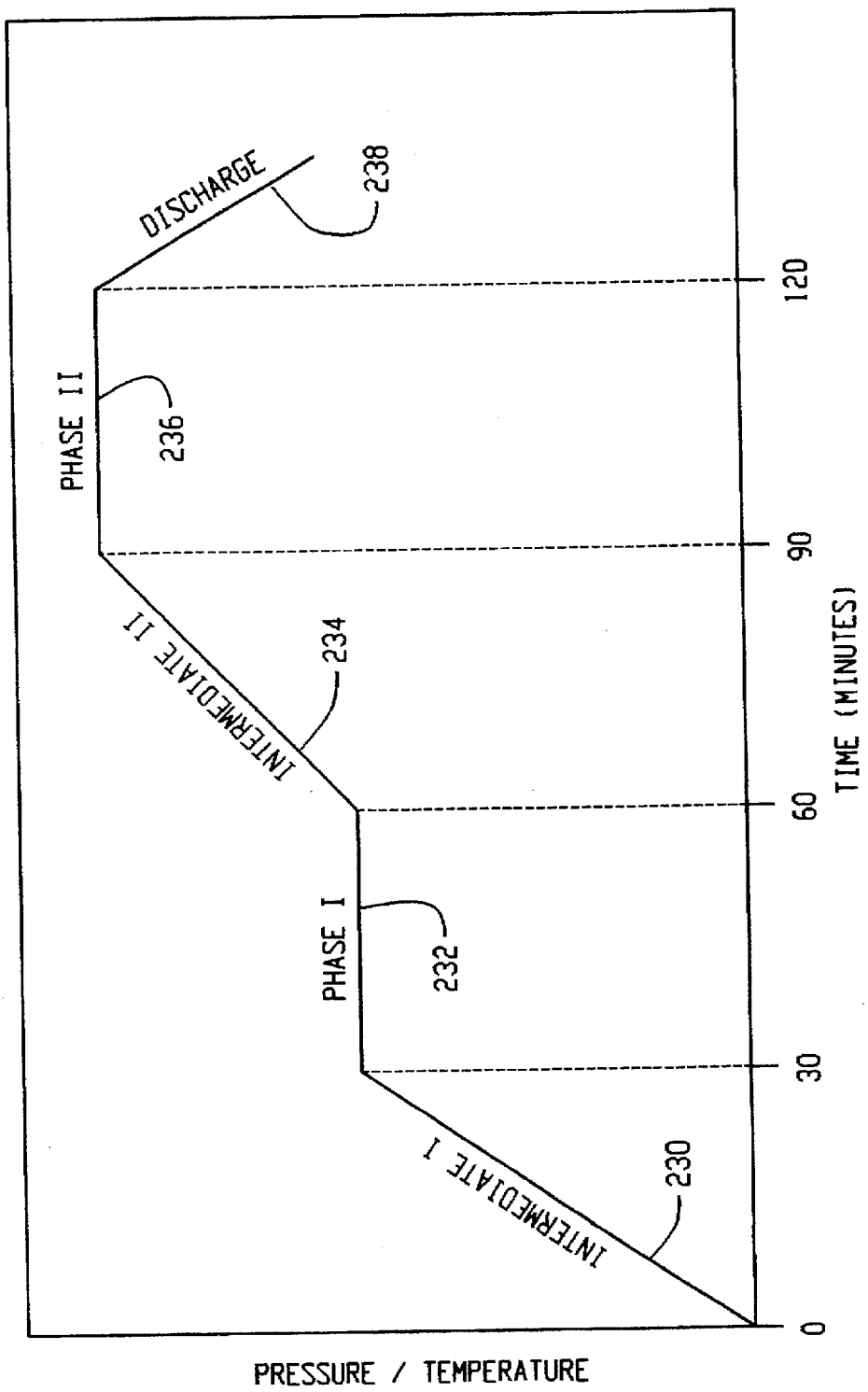
FIG. 15 is a representative graph of a typical reaction process that can be carried out using the concepts of the present invention.

After the reactor tank 120 contains the selected starting material and process media, the selected process reaction is carried out through a combination of agitation, pressure and temperature control to carry out the reaction using a supercritical fluid. A typical process reaction is illustrated in FIG. 15. Such a typical process includes any number of phases wherein each phase can be characterized, for example, by a desired viscosity of the mixture, temperature and pressure. In the exemplary process of FIG. 15, the reaction is initiated by a transition or intermediate phase 230 during which pressure and temperature build over a selected time period (for example, but not limited to, ten to sixty minutes) to selected setpoints as monitored using the pressure and temperature sensors 180, 182.

A first phase region is indicated by the horizontal segment 232, indicating that during a phase period the temperature and pressure are generally maintained at the setpoints for the reaction. Phase one can be, for example, a dispersal phase during which the starting materials are initially mixed by the agitator. Throughout the reaction process, temperature and pressure are regulated in a closed loop manner using the heat/cool jacket 134 as needed to maintain the process media 104 in a supercritical state.

At the completion of the first phase 232, a second transition region 234 may be used to build temperature and pressure to second setpoints for carrying out a second phase 236. The second phase can be, for example, a mixing phase exhibiting lower viscosity of the mixture, and higher temperature and pressure to thoroughly complete the reaction process. At the end of the second phase, pressure and temperature drop during a discharge period 238 during which the finished reaction or product is delivered to the receiver vessel 140. Through out the reaction process typified in FIG. 15, temperature of the reaction mixture can be controlled using the heat/cool jacket 134, 134a. Pressure is regulated through the use of one or more vent valves and feed valves for adding process media to the mixture under pressure.

In accordance with a further aspect of the invention, the mixture viscosity, as well as the dispersal and mixing operations, can be controlled and monitored by the system 100 based on the speed, torque and power draw of the agitator 130. As indicated in FIG. 2, the controller 152 receives agitator status feedback input 240, which can include speed, torque and agitator motor current. These parameters can be developed in real time from conventional speed, torque and current sensors (not shown) provided with the agitator apparatus. In multi-step mixing processes the sensing of the agitation response to various viscosity regimes is important to control successfully the quality of the final product. Each mixing phase can be characterized by a desired power input, via the agitator, to achieve the desired mixing operation, whether the operation be dispersion, mixing or some other function carried out by the agitation process. As another example, during dispersion and mixing phases it may be desirable to keep the temperature of the reaction below a desired setpoint. Monitoring the agitator parameters permits maximum power to be delivered by the agitator within the required temperature constraints for the recipe. Thus, the agitator parameters such as speed, torque and power will be selected for each phase according to the recipe for the selected reaction process, and further should be monitored and controlled for adjustments as needed based on additional monitored parameters such as reactor tank 120 pressure and temperature. Monitoring of the agitation system allows a process to maximize power input during dispersion while assuring that during blending phases the system adheres to a desired mixing regime, e.g. the Laminar mixing regime as defined by a Reynold's number.

The control routine for a REACTION PHASE SEQUENCE 310 is listed in FIG. 9. Temperature and pressure setpoints are maintained according to the reaction process requirements. These setpoints are controlled in part by control loops for the heat exchanger 114, the vessel 120 heating/cooling system associated with the heat/cool jacket 134, 134a, and the band heater 144a associated with the flush valve 144. If the reaction pressure falls below the pressure setpoint, and further cannot be returned to the setpoint by temperature or agitator control, the GO FILL subroutine 314 is called (FIG. 10). The GO FILL subroutine begins with execution of the PURGE subroutine 308 previously described herein with respect to FIG. 8. The PURGE routine insures that vapor is not in the system high pressure liquid piping prior to actuating the high pressure pumps so that the pumps operate on liquid only. After PURGE is complete, the system returns to the GO FILL routine and the high pressure pumps 110 are started and the liquid feed valve 116 is opened. The liquid process media is fed under pressure into the reactor tank 120 until the pressure setpoint is again attained. If desired, the quantity of media added to the mixture can be monitored using the mass flow meter 206. The feed valve 116 is then closed when the pressure setpoint is reached, and the high pressure pumps 110 are turned off. This completes the GO FILL subroutine, and this routine can be called anytime during the REACT PHASE SEQUENCE 310 to assist in maintaining the pressure setpoints imposed during the selected reaction process.

In accordance with another aspect of the invention, the system 100 is configured to allow for recovery of as much as the process media 104 as can be accomplished within the operating requirements of the system. High pressure recovery, such as from the reactor tank 120 during a reaction process, can be accomplished by opening vent valves 170, 242 to the condenser 126. Low pressure recovery can be accomplished using valve 258 (reactor tank 120) and valve 260 (receiver tank 140) connected to the compressor 122. In some instances, however, pressure rise in the reactor and/or receiver tanks will exceed acceptable limits, in which case the excess pressure can be directly vented to atmosphere (or a recovery bag). The various routines related to the media recovery function are set forth for this embodiment in FIG. 10A. These include high pressure recovery from the reactor tank, and recovery during and after delivery.

During the REACT PHASE SEQUENCE 310, when the pressure rises above the commanded setpoint and cannot be controlled by temperature or agitator control alone, a MEDIA RECOVERY subroutine 312 is called during which the reactor tank vent valve 170 is opened. After the vent valve is opened, a depressurization control valve 242 is modulated so as to allow process media vapor to escape from the reactor tank 120, thus lowering the pressure back to the commanded setpoint. The depressurization valve 242 is part of the process media recovery system, so that the vapor vented during the VENT routine is filtered (through filter 124) and then fed to the recovery condenser 126 and back to the storage tank 102 as liquid. When the reactor tank 120 pressure returns to the pressure setpoint, the valves 170, 242 are then closed. This recovery mode can be used when the vented gas is above, for example, 250 psi which insures that the vapor will flow to the condenser 126. When the vapor pressure from the reactor tank 120 is below 250 psi (such as for example after the delivery sequence is completed), the control valve 258 can be opened to the compressor 122 to raise the pressure of the vapor before it passes to the condenser.

In addition to the temperature and pressure control during the REACT PHASE SEQUENCE, an AGITATOR control routine 315 (FIG. 10B) can also be used. In this embodiment, the agitator 130 power, torque, speed, operating time, current and rate of speed increase are monitored and controlled to setpoints that are imposed based on the phase of the reaction process. The agitator operating parameters thus further provide a convenient technique for determining when the reaction process passes through the various phases as specified by the particular recipe. Thus, in this embodiment, the agitator is assigned a phase number consistent with the reaction phase number, and these numbers are updated as the reaction process progresses through each phase and regime.

As indicated in FIG. 9, each phase of the reaction is timed in accordance with the selected reaction process, and the routine continues until all phases have been completed.

Some reaction process recipes will dictate that additional material is to be added to the mixture during the reaction process. Such material may include, for example, catalysts, curing agents, temperature sensitive material (that can only be added when reactor 120 temperature is below a specified value for example), coloring agents such as pigments, and so on. Because this material is being added to the reaction mixture during the reaction process, it is added under pressure. Adding material, particularly solid material, to the reactor vessel 120 under pressure entails particular control problems. In accordance with the invention, a suitable control sequence for such control is listed in FIG. 11 and is referred to herein as a BATCH ADJUST sequence 316 (also referred to herein as "trim add").

BATCH ADJUST begins by confirming that the transfer valves 176, 178 to the reactor tank 120 are closed. The pressure in the trim add hopper or vessel 150 is checked using a trim vessel pressure transducer 244. If the pressure is not zero, a vent valve 246 is opened and then reclosed. With zero pressure in the trim add hopper 150, a batch adjust charge valve 248 is opened to allow the operator access to the hopper 150 for loading the material which will be added to the reactor vessel 120.

Because of the high pressures inside the reactor vessel 120, the pressure in the trim add hopper 150 must be increased to permit delivery of material to the reactor 120. This pressure is provided in this embodiment using the process media 104. This is accomplished by first performing a vapor fill sequence to a back pressure of, for example, 300 pounds, again to prevent icing when the liquid process media is fed to the hopper 150. Vapor back pressure is introduced into the trim add hopper 150 by opening a trim vapor fill valve 250. Note that the piping to valve 250 is connected to the vapor source in the holding tank 102. After the appropriate back pressure is reached, the vapor fill valve 250 is closed and a liquid fill valve 252 is opened to allow liquid media to enter the hopper 150 under pressure from the high pressure pumps 110. The hopper is filled until the pressure in the hopper (as detected by the pressure transducer 244) reaches the pressure in the reactor tank 120 plus three hundred psi, for example, although trim add at different pressures can also be accomplished if needed for a particular application. At this point, the liquid fill valve 252 is closed and the batch adjust transfer valves 176 and 178 are opened to feed the material in the hopper 150 into the reactor valve under high pressure. After the material is added, the transfer valves 176, 178 are closed and the batch adjust hopper 150 can be vented by opening the vent valve 246 and then closing it to complete a BATCH ADJUST sequence.

After the selected reaction process is completed, by indication that all the reaction phases have been completed and timed out, the system enters the DELIVERY subroutine 318 (FIG. 12). In accordance with another aspect of the invention, delivery of finished reaction product to the receiver tank 140 is performed under high pressure transfer from the reactor tank to the receiver tank. The finished reaction can be sprayed, for example, at supersonic velocities into the receiver tank 140 through the nozzles 146. The DELIVERY sequence begins by the system 100 controlling the receiver (also referred to in the drawings as the atomization vessel) vessel 140 pressure to a setpoint determined by the characteristics of the finished reaction and the atomization required for spraying the material into the tank.

If the receiver tank 140 pressure is greater than the setpoint, the receiver vent valve 216 can be opened. If the receiver tank pressure is below the setpoint, the vapor feed valve 164 is opened to allow media vapor to enter the receiver tank under pressure. Once the receiver tank 140 pressure setpoint is reached the feed valve 164 is closed and the agitator speed and direction is adjusted for delivery. The agitator 130 is used to assist delivery of the finished produce to the receiver tank 140. The agitator can be controlled using a subroutine control loop during which the agitator parameters such as speed, torque, power, rate of speed increase, direction and so on are monitored and controlled to setpoints determined by the selected reaction process. The system 100 then initiates a GO FILL sequence 314 to add liquid media to the reactor tank 120 to assist in high pressure delivery of the finished reaction to the receiver tank 140.

Also during delivery, a pressure assist routine can be used for aerosoling. When aerosol pressure is to be used during delivery, the system opens an aerosol control valve 262 connected in line to an aerosol gas storage tank 264. The aerosol gas is stored under high pressure in the tank 264. The aerosol gas may be the same or different from the media 104 as specified by the recipe for the selected reaction process. Other gases or fluids include high pressure nitrogen, nitrous oxide or any other suitable high pressure gas or fluid. These aerosol gases should be delivered from 1 psi to 1000 psi above the entry pressure through the tank 140 as monitored by the pressure transducer 212.

The $CO_2$ media recovery function can also be initiated during delivery (alternatively, excess receiver tank pressure can simply be vented). As listed in FIG. 10A, during delivery, high pressure recovery can be accomplished by opening the recovery valve 254 (the back pressure regulator valve 256 is also operational). If the receiver tank pressure rate of increase or actual value still exceeds the acceptable pressure setpoints during delivery, even with the media recovery routine operational, then the vent valve 216 is opened. The vent valve 216 is then closed after the receiver tank 140 pressure returns to the setpoint. Thus, to the extent possible the media 104 is recovered but for safety reasons the pressure can be vented to atmosphere if necessary.

Additionally during delivery, the system initiates a DELIVERY PRESSURE CONTROL subroutine 320 (FIG. 13). This subroutine is used to maintain the receiver tank 140 pressure at a selected setpoint for the delivery sequence. This is accomplished by opening the flush valve 144 (which opens to the bottom of the reactor tank for delivery to begin), and also opening the recovery valve 254 which is opened if the receiver pressure exceeds the setpoint (detected by the receiver tank pressure transducer 212). The flush valve 144 responds to a signal which sets the velocity and degree of opening of the valve. Typically, the valve 144 remains open throughout the delivery cycle. Because the flow of finished reacted material from the reactor tank 120 to the receiver tank 140 exhibits a substantial pressure drop, the flush valve 144 as well as the piping between the valve 144 and the receiver tank, is provided with the band heaters 144a. These heaters can be used to prevent particle coalescing and maintain the finished reaction above the glass transition temperature. During delivery, the system attempts to maintain the receiver tank setpoint pressure by use of the recovery valve 254 and a receiver back pressure regulating valve 256, but if the tank 140 pressure cannot be so controlled, the system can also modulate the transfer valve 142. The system, in this embodiment, operates to maintain a setpoint pressure in the reactor vessel 120, the receiver vessel 140, and a setpoint pressure differential between the reactor tank 120 and the receiver tank 140, as detected by the tank pressure transducers 180 and 212. The maintenance of this pressure differential helps assure uniform particle structure. If during delivery the reactor tank 120 pressure drops below its setpoint, liquid media can be added via the feed valve 116 when operating the high pressure pumps 110.

As delivery of the finished reaction nears completion, the velocity of flow through the nozzles 146 increases dramatically, and, in accordance with another aspect of the invention, this can be detected, for example, by a reactor vessel 120 pressure rate of change (pressure drop rate). Alternatively, the pressure build rate in the receiver vessel 140 could be monitored, or a combination of both, for example. The agitator rate of power consumption can also be used to indicate when delivery is near completion.

After delivery is completed, the transfer valve 142 is closed and the system 100 can be depressurized using the DEPRESSURIZATION routine 322 (FIG. 14). The DEPRESSURIZATION sequence can be completed by opening the various vent valves and recovery valves to control return of the system to atmospheric pressure. DEPRESSURIZATION begins with reactor tank 120 $CO_2$ recovery set forth in FIG. 10A.

Note in FIG. 10A that, after delivery is completed, the reactor tank recovery routine begins with valves 254 and 258 closed. The recovery valves 170 and 242 are then opened (assuming that the reactor pressure exceeds 250 psi) and the vapor is recovered to the condenser 126. The reactor tank pressure then falls to a setpoint and valve 242 is then closed. During this recovery, a liquid recirculation valve 220 is open so that liquid media recirculates via the compressor 122. After the first setpoint is reached, the valves 242 and 220 are closed and the low pressure recovery valve 258 is opened. This permits low pressure vapor to flow to the compressor 122 and from the compressor to the recovery condenser 126. When the reactor tank 120 pressure falls to a second setpoint, the valves 170 and 258 are closed.

Returning to FIG. 14, after reactor tank 120 low pressure recovery, as indicated by closure of valves 170 and 258, is completed, vent valve 188 is opened to bring the reactor tank to atmospheric pressure.

After reactor tank 120 recovery is completed, the system carries out receiver tank 140 recovery. As further shown in FIG. 10A, after the reactor tank recovery is completed, the receiver tank 140 recovery is initiated, and during this routine the valve 220 is closed. Receiver tank 140 recovery involves opening the receiver tank recovery valve 260 which allows vapor to flow to the compressor 122 for recovery. After the receiver tank 140 pressure falls to a setpoint, the recovery valve 260 is closed. The receiver vent valve 216 is then opened to bring the receiver tank 140 to atmospheric pressure.

Those skilled in the art will readily appreciate that the flexibility of the described system also permits a variety of alarm systems to be activated based on various elements of the system reaching critical pressures (such as the reactor and receiver vessels, for example), as well as issuing alerts when pump operation is unsafe, and so on.

The invention thus provides an automatic electronic control system for controlling a number of selectable processes using supercritical fluid, such a system being fully compatible with manual operation back up. The system allows for the addition of material at high pressure, controls flow and recovery of the process media for both the reaction process as well as assisting delivery of the finished reaction to a receiver tank, and further provides control of the system pressures and temperatures through the use of various sensors, valves and heat exchangers.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. Control system for a process using supercritical fluid, comprising:

a reactor pressure vessel including an agitator for mixing a batch of materials therein;

a source of process media;

first delivery means for introducing the process media into the pressure vessel;

heating/cooling means for controlling temperature in the pressure vessel to maintain the process media at a supercritical state;

second delivery means for introducing into the pressure vessel batch material that is mixed in the presence of the process media in a supercritical state based on a selectable reaction process to produce a finished mixture;

process monitoring means for producing feedback signals representative of the reaction in the pressure vessel;

a receiver vessel having at least one nozzle therein for transferring the finished mixture into the receiver vessel to produce a finished product;

valve means for controlling transfer of the finished mixture from the pressure vessel to the receiver vessel and for controlling pressure in said receiver and pressure vessels; and electronic control means for controlling the reaction in the reactor vessel and transferring the finished mixture to the receiver vessel, based on said feedback signals and the selected reaction process; said control means also controlling operation of said valve means, said first delivery means, said heating/cooling means and said agitator to carry out the selected reaction process; said control means controlling transfer of the finished mixture from the pressure vessel to the receiver vessel by variable control of said valve means, said first delivery means and said agitator.

2. The apparatus of claim 1 wherein said selected process is used to produce coating powders.

3. The apparatus of claim 1 wherein said process monitoring means comprises temperature and pressure sensors for detecting temperature and pressure characteristics of the reaction mixture in said pressure vessel and of the operating conditions within the receiver vessel.

4. The apparatus of claim 3 wherein the mixture goes through a plurality of phases and viscosity changes during the selected reaction process, said control means operating to monitor and control different mixing phases and phase changes of the selected reaction process by monitoring operating characteristics of the agitator and controlling the operation of the agitator based on said operating characteristics and the selected reaction process.

5. The apparatus of claim 1 wherein said control means comprises motor means for producing signals that represent agitator speed, torque and power characteristics, said control means monitoring said agitator characteristics to determine mixture viscosity; said control means modifying said agitator operating speed, torque and power based on the selected reaction process.

6. The apparatus of claim 1 wherein said control means comprises an electronic controller for automated operation and control of the system, with manual backup operation.

7. The apparatus of claim 1 wherein said control means comprises batch adjust means for adding solid material to the mixture under pressure in the pressure vessel; said batch adjust means comprising a transfer valve means under control of said control means for transferring solid material to the pressure vessel during a reaction process; said control means controlling a flow of process media to transfer the solid material under pressure to the pressure vessel.

8. The apparatus of claim 7 wherein said control means comprises a second vessel for holding the material to be added, means for introducing into said second vessel said process media under pressure greater than said pressure vessel pressure, and means for controlling delivery of said added material to said reactor vessel.

9. The apparatus of claim 1 further comprising first pump means for pumping said media under pressure to the pressure vessel, and second pump means for providing said media under pressure to said first pump means; said control means controlling said first pump means to back pressure the system with vapor prior to pumping liquid media through the system.

10. The apparatus of claim 9 wherein said second pump means pumps liquid media to said first pump means to prime said first pump means before said first pump means is used to pump media to the system.

11. The apparatus of claim 1 wherein said control means executes a vapor fill operation to a predetermined back pressure in said pressure vessel prior to fluid being pumped into the reactor.

12. The apparatus of claim 1 wherein said valve means comprises a delivery valve for controlling flow of the finished mixture from the pressure vessel to the receiver vessel, the apparatus further comprising pressure transducers disposed respectively on high and low pressure sides of the delivery valve, and further wherein said control means operates said delivery valve to maintain a selected pressure differential between the pressure vessel and the receiver vessel.

13. The apparatus of claim 12 wherein said control means further controls said selected pressure differential by controlling delivery of additional media to the pressure vessel, controlling said agitator speed and venting said receiver vessel.

14. The apparatus of claim 13 wherein said control means maintains substantially isobaric delivery of the finished mixture to the receiver vessel.

15. The apparatus of claim 12 wherein said control means detects completion of delivery of the finished mixture from the pressure vessel to the receiver vessel based on a velocity estimation of the mixture at said nozzles.

16. The apparatus of claim 15 wherein said velocity estimation is based on a receiver vessel pressure rate of change determination.

17. The apparatus of claim 12 wherein said control means control delivery of the finished mixture to said receiver vessel with gas assisted delivery.

18. The apparatus of claim 1 further comprising means for recovering said media from said pressure vessel under high and low media pressure conditions and returning said recovered media to said source.

19. The apparatus of claim 1 further comprising a heat exchanger for controlling temperature of the supercritical media upstream of the pressure vessel; said heat exchanger being controlled by said control means.

20. The apparatus of claim 1 further comprising means for recovering said media from the receiver vessel and returning said recovered media to said source.

21. The apparatus of claim 1 further comprising a flush valve and piping disposed between said pressure vessel and said receiver vessel; said control means controlling delivery of finished mixture from said pressure vessel to said receiver vessel, said flush valve and piping including heater means controlled by said control means during transfer of the finished mixture to the receiver vessel for maintaining said delivered product above a setpoint temperature to reduce coalescing.

* * * * *